US011413801B2

(12) United States Patent
Armbruster

(10) Patent No.: US 11,413,801 B2
(45) Date of Patent: Aug. 16, 2022

(54) INJECTION MOLDING DEVICE

(71) Applicant: FOBOHA (GERMANY) GMBH, Haslach (DE)

(72) Inventor: Rainer Armbruster, Wolfach (DE)

(73) Assignee: FOBOHA (GERMANY) GMBH, Haslach (DE)

( * ) Notice: Subject to any disclaimer, the term of this patent is extended or adjusted under 35 U.S.C. 154(b) by 673 days.

(21) Appl. No.: 15/304,809

(22) PCT Filed: Apr. 14, 2015

(86) PCT No.: PCT/EP2015/058047
§ 371 (c)(1),
(2) Date: Oct. 17, 2016

(87) PCT Pub. No.: WO2015/158702
PCT Pub. Date: Oct. 22, 2015

(65) Prior Publication Data
US 2017/0036379 A1 Feb. 9, 2017

(30) Foreign Application Priority Data
Apr. 17, 2014 (CH) .................................... 00598/14

(51) Int. Cl.
*B29C 45/00* (2006.01)
*B29C 45/04* (2006.01)
(Continued)

(52) U.S. Cl.
CPC ........ *B29C 45/045* (2013.01); *B29C 45/1628* (2013.01); *B29C 45/2681* (2013.01); *B29C 2045/2689* (2013.01)

(58) Field of Classification Search
CPC ........................ B29C 45/1628; B29C 45/045
See application file for complete search history.

(56) References Cited

U.S. PATENT DOCUMENTS 3,574,894 A * 4/1971 Aoki ..................... B29C 45/06
425/576
4,444,711 A * 4/1984 Schad .................. B29C 45/045
264/243
(Continued)

FOREIGN PATENT DOCUMENTS

DE        10 121 691 A1    11/2002
EP        00 58 947 A1     9/1982
(Continued)

*Primary Examiner* — Nicholas R Krasnow
(74) *Attorney, Agent, or Firm* — Pauley Erickson & Swanson

(57) ABSTRACT

The invention relates to an injection molding device (1) with at least one first and at least one second outer mold half (11, 12), which are arranged in a movable manner relative to each other in a first direction (x). A central part (5) which can be rotated about a rotational axis (17) is arranged between the two mold halves, said central part having an upper part (6) and a lower part (7). First inner mold halves (13) are attached in pairs to the lower part (6), and second inner mold halves (14) are attached in pairs to the upper part (7). Said inner mold halves interact with the in a closed position thereto assigned first and second outer mold halves (11,12) in order to form cavities. The first and the second inner mold halves (13, 14) and the assigned first and second outer mold halves (11, 12) form a lower and an upper production plane (32, 33).

19 Claims, 3 Drawing Sheets

(51) Int. Cl.
    *B29C 45/16*    (2006.01)
    *B29C 45/26*    (2006.01)

(56) References Cited

U.S. PATENT DOCUMENTS

| | | | | |
|---|---|---|---|---|
| 4,734,023 | A * | 3/1988 | Nesch | B29C 45/1628 425/130 |
| 4,786,455 | A | 11/1988 | Krishnakumar et al. | |
| 4,836,767 | A * | 6/1989 | Schad | B29C 45/062 264/237 |
| 5,750,162 | A * | 5/1998 | Schad | B29C 45/045 425/533 |
| 5,817,345 | A * | 10/1998 | Koch | B29C 45/045 425/130 |
| 6,179,605 | B1 * | 1/2001 | Littleton | B29C 45/0441 425/547 |
| 6,296,796 | B1 * | 10/2001 | Gordon | B29C 39/021 264/255 |
| 6,447,280 | B1 * | 9/2002 | Grimm | B29C 45/045 425/116 |
| 9,168,687 | B2 * | 10/2015 | Armbruster | B29C 45/045 |
| 2003/0094732 | A1 * | 5/2003 | Payette | B29C 45/045 264/255 |
| 2004/0211509 | A1 * | 10/2004 | Hartlmeier | B29C 45/045 156/245 |
| 2009/0032996 | A1 * | 2/2009 | Orden | B29C 45/0416 264/271.1 |
| 2011/0298151 | A1 * | 12/2011 | Atance Orden | B29C 45/1625 264/255 |
| 2013/0037735 | A1 * | 2/2013 | Hsieh | B29C 45/14836 251/231 |
| 2013/0142460 | A1 * | 6/2013 | Ng | F16C 29/007 384/49 |
| 2013/0302457 | A1 * | 11/2013 | Zahoransky | B29C 45/10 425/104 |
| 2014/0252677 | A1 * | 9/2014 | Grimm | B29C 45/40 264/255 |
| 2014/0319732 | A1 * | 10/2014 | Olaru | B29C 45/7207 264/328.16 |
| 2016/0121529 | A1 | 5/2016 | Armbruster | |
| 2016/0221070 | A1 * | 8/2016 | Gaudin | B22D 17/002 |
| 2017/0095959 | A1 * | 4/2017 | Gaudin | B29C 45/40 |

FOREIGN PATENT DOCUMENTS

| | | | |
|---|---|---|---|
| EP | 0 070 189 A1 | 1/1983 | |
| EP | 1 035 959 A1 | 9/2000 | |
| EP | 1 119 449 A1 | 8/2001 | |
| EP | 1 155 802 A2 | 11/2001 | |
| EP | 1 174 242 A2 | 1/2002 | |
| EP | 1 725 386 A1 | 11/2006 | |
| EP | 1 782 936 A2 | 5/2007 | |
| JP | 2006-35667 A | 2/2006 | |
| WO | WO 99/28108 A1 | 6/1999 | |
| WO | WO 01/10624 A1 | 2/2001 | |
| WO | WO 2005/077637 A1 | 8/2005 | |
| WO | WO 2007/082394 A1 | 7/2007 | |
| WO | WO 2007/085063 A1 | 8/2007 | |
| WO | WO 2011/107395 A1 | 9/2011 | |
| WO | WO 2013/001022 A1 | 1/2013 | |
| WO | WO-2013001022 A1 * | 1/2013 | B29C 45/0441 |

* cited by examiner

INJECTION MOLDING DEVICE

BACKGROUND OF THE INVENTION

Field of the Invention

The present invention applies to the field of tools and machines for injection molding of plastics and other thermoplastic materials.

Discussion of Related Art

Injection molding devices having one or more rotating central parts are known from the prior art, which are used to efficiently produce multi-component plastic parts through injection molding. At least one rotatable mold center part (center block), which is fixed to a holding device and is arranged so as to be able to rotate about a rotational axis, is arranged between two mold halves that are movable relative to one another along bars in a first direction. The rotatable mold center part has at least two parallel side surfaces, along which it interacts with the two mold halves to form cavities. In certain embodiments, the rotatable mold center part may interact at least on one side with a further rotatable mold center part. Coordination means cause the rotatable mold center part to remain positioned centrally between the two mold halves during opening and closing, and thus collisions can be avoided. A variety of holding devices for the rotatable central part are known from the prior art.

EP 1035959 and EP 1155802 were published in 1999 by the same applicant, and both relate to a holding device for a rotatable central part (mold, mold half, mold carrier). The holding device has a lower and an upper cross member which are guided along the bars of an injection molding machine. Each cross ember of the holding device has a rotatable holding means, which serves to releasably clamp the mold, mold half, or mold carrier therebetween.

EP 1725386 of the same applicant was published in 2005, and relates to a method and an injection molding device with more than one rotatable central part. This makes it possible to manufacture parts in two outer parting planes and to assemble these in a further parting plane in a further manufacturing step. In the figures, different embodiments of holding devices for the rotatable central parts are illustrated.

WO 2011/107395 by the same applicant was published in 2011 and describes a holding device with a modular structure, which can be flexibly adapted to different injection molding machines. Different types of holding are described.

WO 2013/001022 by the same applicant was published in 2013 and describes a holding device for a rotatable center part. The central part is mounted on a non-rotatably arranged column having supply channels in the interior.

EP 1119449 by the company Krauss Maffei was first published in 2001 and shows a two-plate horizontal injection molding machine. That injection molding machine has a holding device that is for a rotatable central part and is mounted on the machine bed. The holding device in the invention is fully detached from the bars and has no operative connection therewith. All occurring forces are transmitted via the machine bed.

Another class of injection molding devices has a non-rotatable center part, around which a transfer system is movably arranged. The transfer system is used to take parts out from cavities of a first parting plane, and introduce the parts into cavities of a second parting plane, where the parts are subjected to a further processing step.

EP 0070189 was published in 1984 by Sumitomo Heavy Industries and relates to an injection blow-molding device having a non-rotatably arranged central part. A transfer system is rotatably mounted onto the central part above and below. The transfer system is used to move parts produced by injection molding in a first parting plane into a second parting plane where the parts are then reshaped by blow molding. The transfer system is a part of the injection molding device and remains within the interior hereof during the production of the parts when the device is closed.

EP 1174242 was published in 2002 by the company Hekuma GmbH and discloses an injection molding device of the aforementioned type, comprising a transfer device that is arranged on the exterior and comes in between the two parting planes from the outside.

DE 10121691 was published in 2002 by the company Zahoransky Formenbau GmbH, and describes an injection molding device of the aforementioned type. The transfer system is based on a chain drive that is arranged around the central mold halves and has two chains that rotate about two rotational axes and move the parts in parallel to the side surfaces of the central mold halves, both comprising cavity halves. The chains are arranged in two slots that are arranged in parallel. The parts produced remain stuck in a movable region of the cavities during transfer, the movable region being fastened to a lifting system.

EP 1782936 was published in May of 2007 by the company Wilden Handels AG, and discloses and injection molding device of the aforementioned type. The central mold halves are composed of a lower part and an upper part that are separated from one another by a slot. Arranged in this slot is a transfer system that is used to transfer the parts from a first parting plane into a second parting plane. The transfer system rotates about a single axis. No details are known about the structure of the injection molding device.

WO 07082394 was published in July of 2007 by the same applicant, and also discloses an injection molding device of the aforementioned type with a central mold half and a transfer system integrated in the mold. The central mold halves have a lower part and an upper part that are separated from one another by a slot. The transfer system rotates about a centrally arranged rotational axis. Regions of the cavities are fastened to radially adjustable cantilever arms that are arranged in the slot between the lower part and the upper part.

WO 07085063 was published in August of 2007 by the company Boucherie NV G B, and is directed to an injection molding device of the aforementioned type. The device described in this publication is very similar in its construction of the transfer system to the one in EP 0070189. Both include a transfer system that is rotatably fixed to the central mold half at the bottom and at the top.

SUMMARY OF THE INVENTION

The present invention addresses the problem of providing an injection molding device that enables especially efficient and flexible production of complex parts.

In one embodiment, the invention comprises an injection molding device with at least one first and at least one second outer mold half, which are arranged in a movable manner relative to each other in a first direction. A central part which can be rotated about a rotational axis is arranged between the two mold halves, said central part having a lower part. Two or four first inner mold halves arranged so as to be paired with one another are attached thereto. The rotatable central part further comprises an upper part that is generally rotatable independently of the lower part. Two or four second inner mold halves arranged so as to be paired with one another are attached thereto. Said inner mold halves interact with the respective first and second outer mold halves, which are paired with the inner halves, in a closed position in order to form cavities. The first and the second inner mold halves and the paired first and second outer mold halves form a lower and an upper production plane.

The present invention makes it possible to produce very complex parts in one device. For example, one or, simultaneously, a plurality of first parts are manufactured in the lower production plane in the region of the first parting plane, the first parts then remaining stuck on the first inner mold halves when the injection molding device is opened, and being delivered from the first parting plane into the second parting plane by rotation of the lower rotatable central part (also called a lower part) about the rotational axis.

After the injection molding device is closed again, the parts are, for example, overmolded respectively operatively connected with another material component or the same component. During the rotation from the first parting plane to the second parting plane, further parts, for example, parts that are supplied from the exterior, with a handling system, operatively connected to the first parts, and/or inserted into the cavities.

The same process or another process may run on the upper production plane. There is also the possibility of transporting the parts from the lower production plane into the upper production plane (or vice versa) in order to subject the parts there to one or more additional processing steps. Alternatively or in addition, parts from the lower production plane and parts from the upper plane can also first be removed from the injection molding device and then operatively connected to one another on the outside. Any other embodiments of production processes are easy to implement with the injection molding device according to the present invention. One or more handling devices may be provided in order for the parts to be transported from the first production plane into the second production plane, and vice versa. These handling devices are advantageously arranged laterally next to the injection molding device.

One variant of the injection molding device according to the present invention has a holding device that is used to hold the rotatable central part in the injection molding machine. The holding device may have a column around which the central part is rotatably arranged. In a preferred variant, the central part has a multi-part design and comprises a lower part and an upper part, which are preferably able to rotate independently of one another.

The column may, for example, be fastened at a lower end thereof to a lower holding device. The lower holding device may directly or indirectly supported via linear bearings on rails, for example, on a machine bed of the injection molding machine. Alternatively or in addition, the lower holding device may be mounted via first bearing shells relative to bars, e.g., in order to receive a torque. The lower holding device may have a lower center block to which the linear bearings and/or the first bearing shells are directly or indirectly fastened. Advantageously, the linear bearings and/or the first bearing shells are fastened to the lower center block via first adapters. The adapters may be designed so as to be adjustable. There is an advantage in that the center blocks can be used for a variety of different embodiments. Advantageously, the lower part is rotatably driven about the rotational axis via a lower drive motor and a lower transmission.

The column may be fastened at an upper end thereof to an upper holding device. The upper holding device may be mounted via second bearing shells relative to upper bars, e.g., of the injection molding machine. The upper holding device may have an upper center block to which the second bearing shells are directly or indirectly fastened. The second bearing shells may be fastened to the upper center block via second adapters. The upper part is generally rotatably driven about the rotational axis via an upper drive motor and an upper transmission. The column may have, in the interior, at least one channel that is used for the exchange of media with the central part. The at least one channel generally opens into at least one groove that is arranged between the column and the central part.

Aspects of the present invention shall be described in further detail with reference to embodiments illustrated in the accompanying drawings, and the associated description thereof.

DETAILED DESCRIPTION OF THE INVENTION

Figure 1:
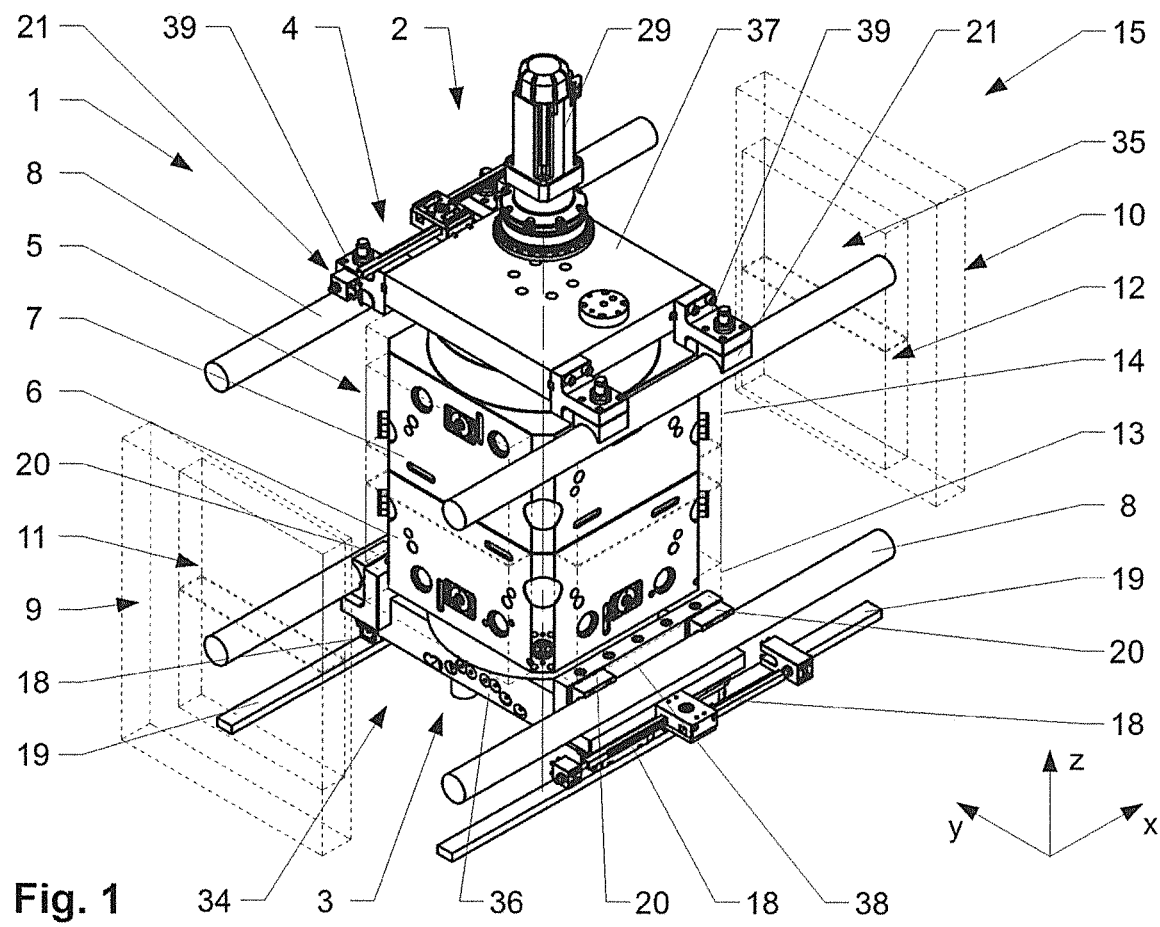
FIG. 1 illustrates an injection molding device in a perspective view from obliquely in front and above.
Figure 2:
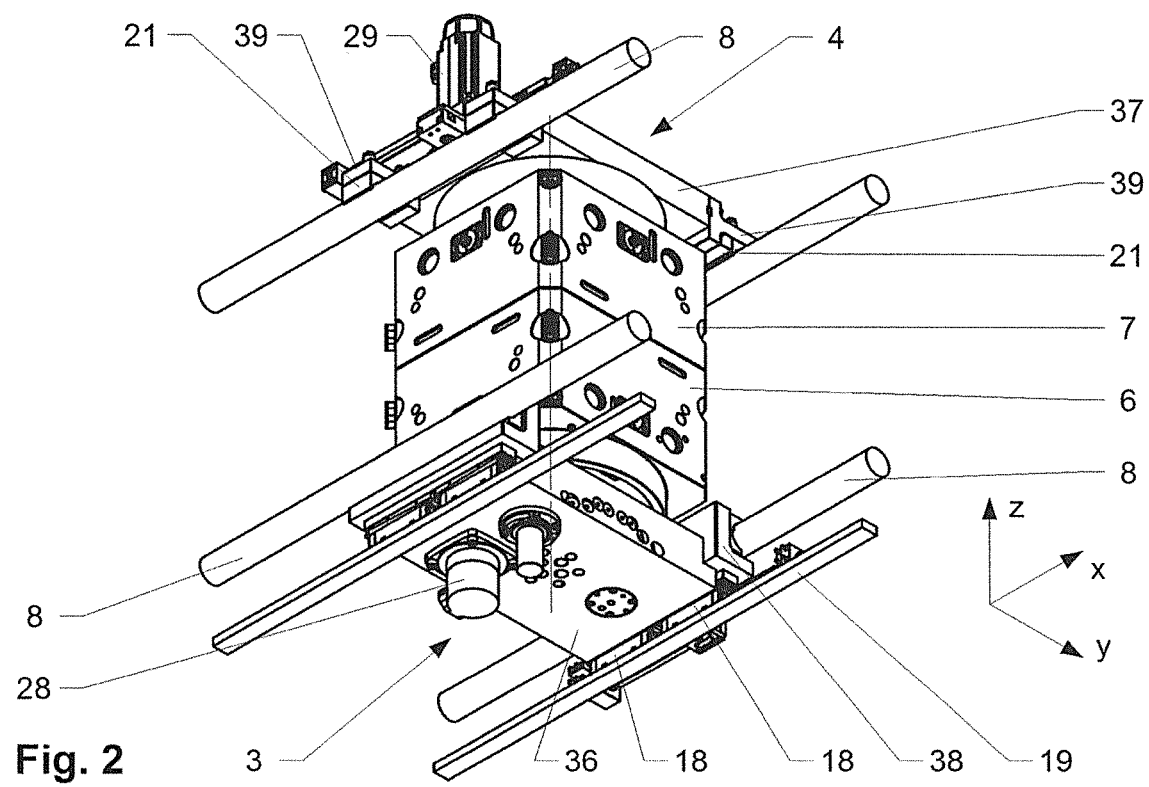
FIG. 2 illustrates the injection molding device in a perspective view from obliquely below and behind.
Figure 3:
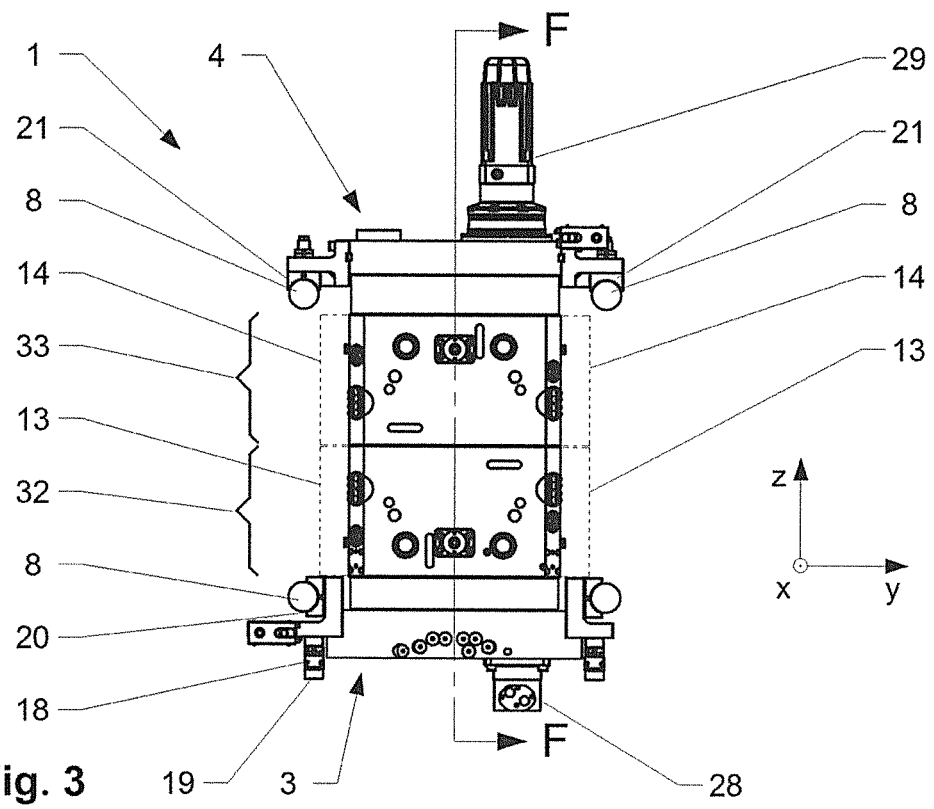
FIG. 3 illustrates the injection molding device in a side view.
Figure 4:
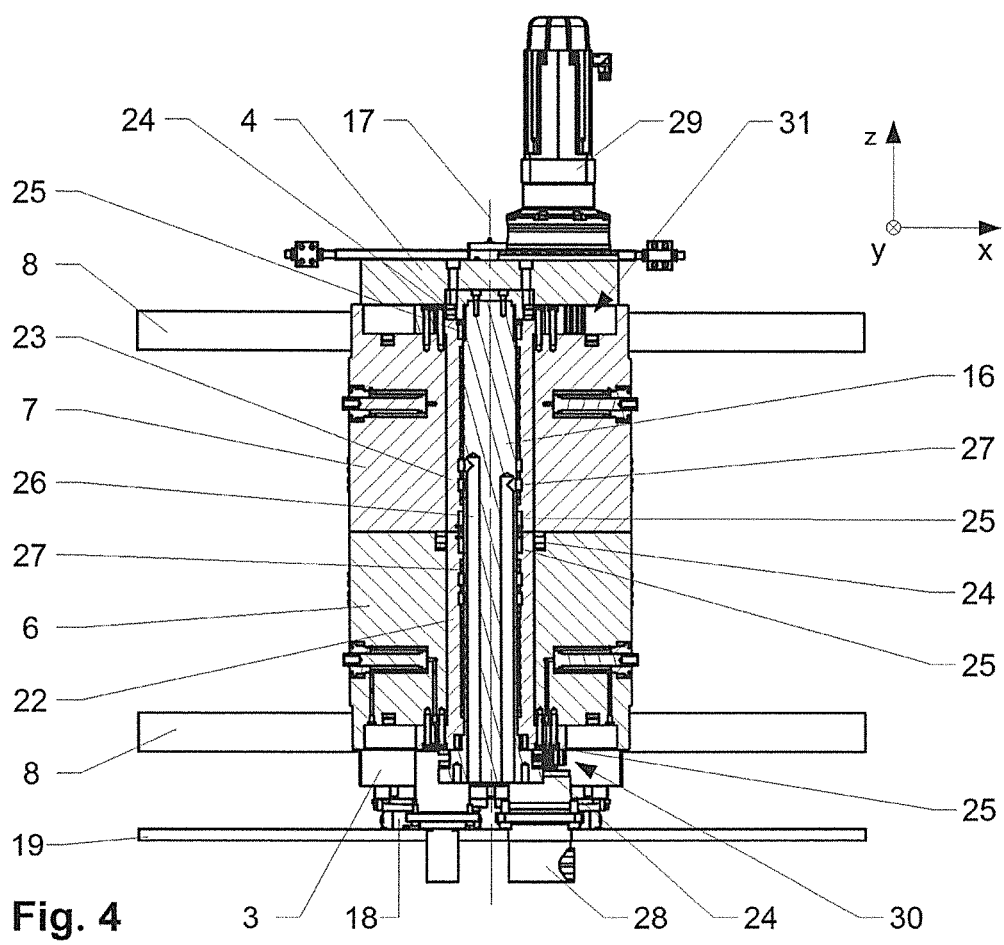
FIG. 4 illustrates the injection molding device in a sectional view along the section line FF according to FIG. 3.
Figure 5:
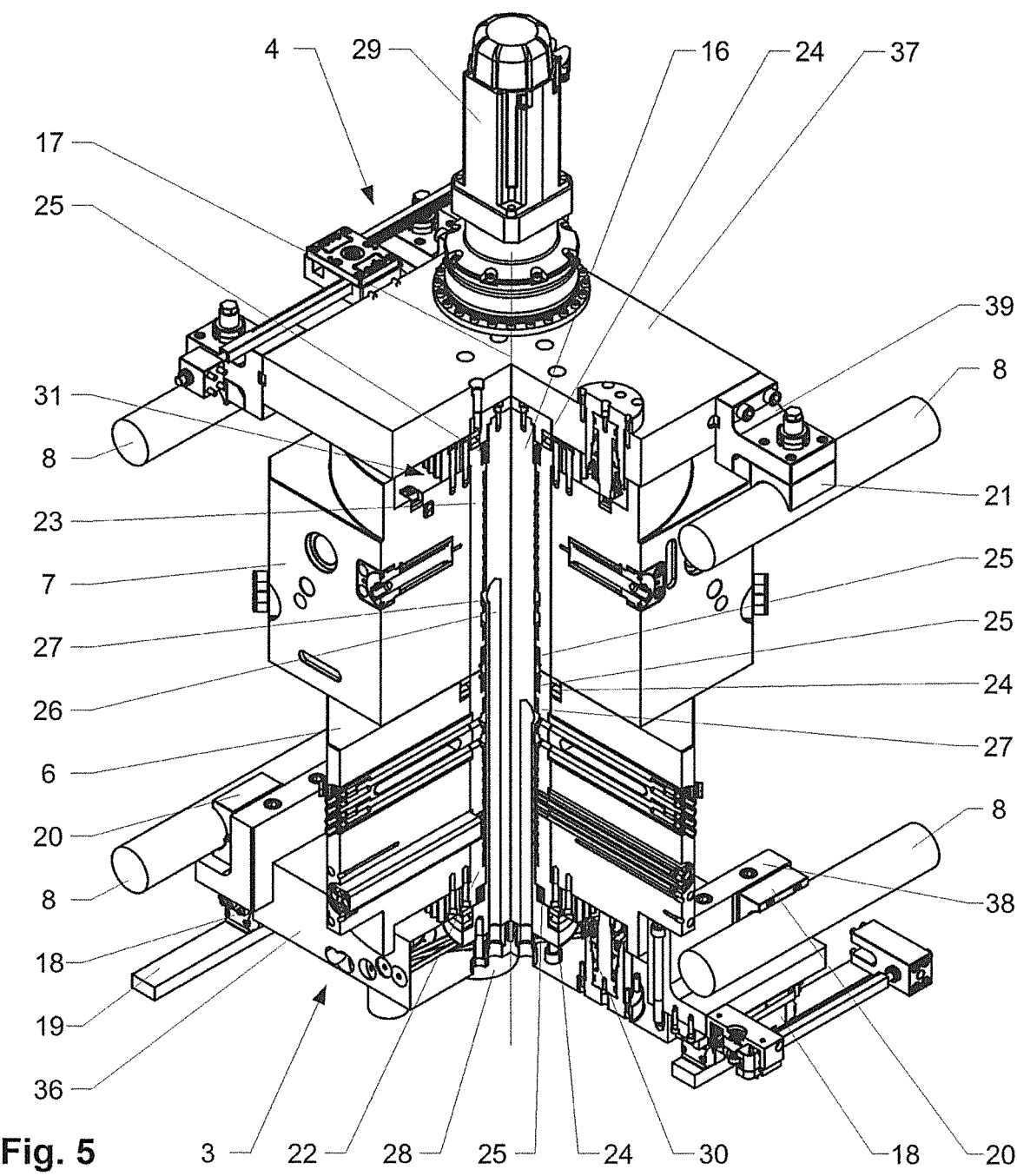
FIG. 5 illustrates the injection molding device in a perspective view and partially cut so that the inner workings are visible.

FIG. 1 illustrates an embodiment of an injection molding device 1 according to the present invention, in a perspective view of an opened state, from obliquely above and in front. FIG. 2 illustrates the same injection molding device 1 from obliquely behind and below. FIG. 3 illustrates the injection molding device 1 in a side view. FIG. 4 illustrates a sectional view through the injection molding device 1, along the section line FF according to FIG. 3. FIG. 5 illustrates the injection molding device 1 in a perspective view and partially cut so that the inner workings are more visible.

The drawings do not depict all of the parts of the injection molding device 1, but rather only the parts thereof that are essential for understanding the function of the present invention. The parts that are not depicted shall be briefly mentioned.

The injection molding device 1 comprises a holding device 2 for a multi-part rotatable central part 3 that is arranged in the injection molding device 1 between two mold clamping plates 9, 10 that are movable relative to one another in a first direction (x-direction) along bars 8 of a commercially available injection molding machine. Outer mold halves 11, 12 of an injection mold tool 15 are fastened to the mold clamping plates 9, 10, the outer mold halves being of a single- or multi-part design. In addition to the first and second outer mold halves 11, 12, an injection mold tool 15 in the present case generally has first and second inner mold halves 13, 14 that are arranged opposite to one another in a paired manner on the lower part 6, respectively the upper part 7 of the rotatable central part 5 and that interact with the first and second outer mold halves 11, 12 to form cavities (not shown) in a closed position of the injection molding device for the production of parts (not shown).

As can be seen in FIG. 1, the first inner mold halves 13 are attached to the lower part 6 and the second inner mold halves 14 are attached to the upper part 7 of the rotatable central part 5 of multi-part design. The lower part 6 and the upper part 7 are rotatably mounted about a rotational axis 17 around a column 16 that is non-rotatably arranged in the embodiment depicted. The rotational axis 17 is generally arranged substantially at a right angle to the first direction.

As can be seen, in particular, in FIGS. 4 and 5, the column 16 extends between the lower and upper holding devices 3, 4, to which the column is operatively connected and forms a stable unit that can, however, be disassembled when necessary.

The lower and upper holding devices 3, 4 have, in the variant of the embodiment depicted, a plate-shaped and thus relatively flat, space-saving design. As seen from FIGS. 1-3 and 5, the lower holding device 3 is supported in the vertical direction (z-direction) via linear bearings (carriages) 18 on rails 19 running in the longitudinal direction (x-direction) in parallel direction to the bars 8, on a machine bed (not shown in greater detail) of the injection molding machine. The mounting in the vertical direction serves primarily to receive the weight load of the holding device 2 and the single- or multi-part rotatable central part 5.

When necessary, the lower holding device 3 is additionally supported on the bars 8 via first bearing shells 20 in the circumferential direction (with respect to the rotational axis 17). The embodiment depicted has a total of four first bearing shells 20 that are configured as half-shells and support on the lower bars 8 from the inside. Thus, the reaction forces that occur when the at least one rotatable central part 5 is rotated about the column 16 can be at least partially transferred to the bars 8 and cushioned thereby, and thus the loading of the linear bearings 18, respectively the rails 19, can be reduced in a targeted manner. Because the first bearing shells can be arranged radially further out with regard to the rotational axis 17, the forces can be additionally reduced. There is an advantage in that the at least one central part 5 can be more rapidly rotated, or in that the device has a more robust design. Depending on the embodiment, the linear bearings 18 and the rails 19 may also be omitted, the forces then being received via the lower and/or upper bars 8, or a rail system that is arranged, for example, above the upper bars 8. The upper holding device 4 is supported via the second bearing shells 21 on the upper bars 8. The second bearing shells 21 enclose the upper bars 8 from above. They are thus able to receive at least a part of the weight load. At the same time, they can be used to support the drive torque.

As can be seen in FIGS. 4 and 5, the lower part 6 and the upper part 7 each have, in the interior, a respective sleeve 22, 23 by means of which they are directly or indirectly mounted via axial bearings 24 and radial bearings 25 with respect to the column 16, respectively the lower and upper holding devices 3, 4. As can be seen, the radial bearings 25 are arranged between the lower part 6, respectively upper part 7 and the column 16. Axial bearings 24 are used to support the lower part 6 with respect to the lower holding device 3. Additional axial bearings 24 are arranged between the upper holding device 4 and the upper part 7, as well as between the lower part 6 and the upper part 7.

The column 16 has, in the interior, channels 26 that are operatively connected to grooves 27 arranged on the inner side of the sleeves 22, 23 and are used to exchange media (for example, a coolant, hydraulic oil, compressed air, or the like). The channels 26 preferably end in the region of the lower and/or upper holding device 3, 4, where the channels are operative connected to corresponding tubes, for example, via quick-action couplings (both not shown). The individual circuits are separated by seals (not shown). The transfer of media in the interior according to the present invention makes it possible to provide more than one rotatable central part 6, 7. Respective drive motors 28, 29 are fastened to the lower/upper holding devices 3, 4. The lower drive motor 28 is operatively connected to the rotatable lower part 6 via a lower transmission 30, and the upper drive motor 29 is operatively connected to the rotatable upper part 7 via an upper transmission 31. The drive motors 28, 29 are used to drive the upper part 6, respectively the lower part 7 and the column 16, respectively about the rotational axis 17. If only one rotatable central part 5 is arranged on the column 16, it may be possible, under certain circumstances, to forgo one of the two drives composed of a transmission and motor. The device described makes it possible to rotate the lower part 6 and the upper part 7 independently of one another about the column 16 in the same direction or opposite directions. Alternatively or additionally, a drive motor may be integrated into one of the rotatable central parts 6, 7.

The injection molding device 1 according to the present invention makes it possible for different or identical parts to be produced separately from one another on lower and upper production planes 32, 33, which are schematically depicted in FIG. 3.

On the lower production plane 32, first parts (not shown) composed of one or more material components can be produced by the interaction of the first inner mold halves 13 with the first outer mold halves 11 in the region of a first and second parting plane 34, 35.

Second parts, which may also be composed of one or more material components, may be produced on the upper production plane 33 by interaction of the second inner mold halves 14 with the associated second outer mold halves 12, also in the region of the first and second parting planes 34, 35. The injection molding device is opened in the region of the first and second parting planes 34, 35 by relative displacement of the mold clamping plates 9, 10, respectively the first and second outer mold halves fastened thereto with respect to the first and second inner mold halves 13, 14 fastened to the rotatable central parts 6, 7.

If necessary, the injection molding device 1 comprises at least one handling system (not shown) that is used, for example, to transport parts from the lower production plane 32 into the upper production plane 33, and/or to remove parts from the injection molding device 1 or insert parts thereinto.

The present invention makes it possible to produce very complex parts in one injection molding device 1 according to the present invention. For example, one or, simultaneously, a plurality of first parts are manufactured in the lower production plane in the region of the first parting plane 34, the first parts then remaining stuck on the first inner mold halves when the injection molding device is opened along the two parting planes 34, 35, and being delivered from the first parting plane into the second parting plane by rotation of the lower rotatable central part (also called a lower part) 6 about the rotational axis 17. After the injection molding device 1 is closed again, for example, the parts are overmolded, respectively operatively connected with another material component or the same component. During the rotation from the first parting plane to the second parting plane, further parts, for example, parts that are supplied from the exterior, with a handling system, operatively connected to the first parts, and/or inserted into the cavities. The same process or another process may run on the upper production plane. There is also the possibility of transporting the parts from the lower production plane into the upper production plane (or vice versa) and subjecting the parts there to one or more additional processing steps. Alternatively or in addition, parts from the lower production plane and parts from the upper plane can also first be removed from the injection molding device and then operatively connected to one another on the outside. Any other embodiments of production processes are early realized with the injection molding device 1 according to the present invention.

The lower holding device 3 has a lower center block 36, and the upper holding device 4 has an upper center block 37. The first and second bearing shells 20, 21 are fastened on the associated center blocks 36, 37 via first and second adapters 38, 39 onto these center blocks 36, 37, which are preferably designed to be standard parts.

Depending on the field of use and the design, one of the holding devices, for example, the upper holding device 4, may be omitted. This is the case, in particular, if only one rotatable central part is arranged on the column 16. This is the case, in particular, if the lower holding device are supported simultaneously via linear bearings 18 and rails 19 on the machine bed and via first bearing shells with respect to the lower bars in the circumferential direction.

The invention claimed is:
1. An injection molding device (1) comprising:
   a. at least one first outer mold half (11) and at least one second outer mold half (12), which are arranged in a movable manner relative to each other in a first direction (x), and
   b. a central part (5) that is arranged therebetween and is rotatable about a rotational axis (17), and comprises
      i. a rotatable lower part (6) to which first inner mold halves (13) are attached opposite and 180 degrees to one another in pairs of aligned mold halves, the first inner mold halves (13) interacting with assigned first and second outer mold halves (11,12) in a closed position in order to form cavities, and
      ii. a rotatable upper part (7) to which second inner mold halves (14) are attached opposite to one another in pairs, said second inner mold halves (14) interacting with assigned first and second outer mold halves (11, 12) in a closed position in order to form cavities,
   c. the rotatable lower part (6) and the rotatable upper part (7) independently rotatable from each other,
   d. the first inner mold halves (13) and the assigned first and second outer mold halves form a lower production plane (32) for the production of first parts and
   e. the second inner mold halves (14) and the assigned first and second outer mold halves (11, 12) form an upper production plane (33) for the production of second parts,
   f. wherein the first parts and the second parts are different non-identical parts each made from two material components.

2. The injection mold device (1) according to claim 1, wherein the injection molding device (1) comprises a holding device (2) that is used to hold the rotatable central part (5) in an injection molding machine.

3. The injection molding device (1) according to claim 2, wherein the holding device (2) includes a column (16) around which the lower part (6) and the upper part (7) of the rotatable central part (5) are rotatably arranged.

4. The injection molding device (1) according to claim 3, wherein the column (16) is fastened at a lower end thereof to a lower holding device (3).

5. The injection molding device (1) according to claim 4, wherein the lower holding device (3) is supported via linear bearings (18) on rails (19).

6. The injection molding device (1) according to claim 4, wherein the lower holding device (3) is supported via first bearing shells (20) relative to bars (8).

7. The injection molding device (1) according to claim 3, wherein the lower holding device (3) includes a lower center block (36) to which the linear bearings (18) and/or the first bearing shells (20) are directly or indirectly fastened.

8. The injection molding device (1) according to claim 7, wherein the linear bearings and/or the first bearing shells (20) are fastened via first adapters (38) to the lower center block (36).

9. The injection molding device (1) according to claim 3, wherein the lower part (6) is driven via a lower drive motor (28) and a lower transmission (30) so as to be rotatable about the rotational axis (17).

10. The injection molding device (1) according to claim 3, wherein the column (16) is fastened at an upper end thereof to an upper holding device (4).

11. The injection molding device (1) according to claim 10, wherein the upper holding device (4) is mounted via second bearing shells (21) relative to bars (8).

12. The injection molding device (1) according to claim 11, wherein the upper holding device (4) includes an upper center block (37) to which the second bearing shells (21) are directly or indirectly fastened.

13. The injection molding device (1) according to claim 12, wherein the second bearing shells (21) are fastened via second adapters (39) to the lower central block (37).

14. The injection molding device (1) according to claim 10, wherein the upper part (7) is driven via an upper drive motor (29) and an upper transmission (31) so as to be rotatable about the rotational axis (17).

15. The injection molding device (1) according to claim 3, wherein the column (16) has, in the interior, at least one channel (26) that is used for the transfer of media to the central part (5).

16. The injection molding device (1) according to claim 15, wherein the at least one channel (26) opens into at least one groove (27) that is arranged between the column (16) and the central part (5).

17. The injection molding device (1) according to claim 1, wherein the injection molding device (1) further transports parts from the lower production plane (32) into the upper production plane (33) and vice-versa.

18. The injection molding device (1) according to claim 1, wherein the injection molding device (1) further removes parts from the lower production plane and parts from the upper production plane and then operatively connects the parts to one another on the outside.

19. The injection molding device (1) according to claim 1, wherein axial bearing (24) support the lower part (6) with respect to the lower holding device (3), and axial bearings (24) are arranged between the upper holding device (4) and the upper part (7), as well as between the lower part (6) and the upper part (7).

* * * * *